United States Patent
Kanamarlapudi et al.

(10) Patent No.: US 9,503,888 B2
(45) Date of Patent: Nov. 22, 2016

(54) ENHANCED TIMER HANDLING MECHANISM

(71) Applicant: QUALCOMM Incorporated, San Diego, CA (US)

(72) Inventors: Sitaramanjaneyulu Kanamarlapudi, San Diego, CA (US); Liangchi Hsu, San Diego, CA (US); Sivasubramanian Ramalingam, Hyderabad (IN); Ramesh Ranganathan Iyer, San Diego, CA (US); Ansah Ahmed Sheik, Eluru (IN); Subachany Gunasegaran, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 98 days.

(21) Appl. No.: 14/514,763

(22) Filed: Oct. 15, 2014

(65) Prior Publication Data

US 2015/0304838 A1    Oct. 22, 2015

Related U.S. Application Data

(60) Provisional application No. 61/981,024, filed on Apr. 17, 2014.

(51) Int. Cl.
| | |
|---|---|
| *H04W 24/00* | (2009.01) |
| *H04W 8/24* | (2009.01) |
| *H04W 8/22* | (2009.01) |

(52) U.S. Cl.
CPC ............... *H04W 8/24* (2013.01); *H04W 8/22* (2013.01)

(58) Field of Classification Search
CPC ... H04L 1/1848; H04L 1/1825; H04L 1/188; H04L 47/10; H04L 1/1621; H04L 1/1657; H04L 1/1678; H04L 1/1841; H04L 1/1854
See application file for complete search history.

(56) References Cited

U.S. PATENT DOCUMENTS

| | | | |
|---|---|---|---|
| 2005/0041585 A1* | 2/2005 | Jiang | H04L 1/1832 370/236 |
| 2010/0054139 A1* | 3/2010 | Chun | H04L 1/1678 370/252 |

(Continued)

FOREIGN PATENT DOCUMENTS

| | | |
|---|---|---|
| EP | 1 361 689 A1 | 11/2003 |
| EP | 2 200 356 A2 | 6/2010 |
| WO | WO-2008/150078 A1 | 12/2008 |

OTHER PUBLICATIONS

Anite Telecoms et al.,: "CR to TS 34.123-1 [REL-5] Package 4 RRC test cases: 8.1.3.5 RRC Connection Release in CELL FACH state: Invalid message 8.3.1.15 Cell Update: Unrecoverable error in Acknowledged Mode RLC SRB", 3GPP Draft; T1-031161, 3rd Generation Partnership Project (3GPP), Mobile Competence Centre, 650, Route Des Lucioles, F-06921 Sophia-Antipolis Cedex, France, vol. T WG1, No. Munich; Jul. 28, 2003-Aug. 1, 2003 Aug. 4, 2003, XP050845350, Retrieved from the Internet: URL:http://www.3gpp.org/ftp/tsg_t/WG1_Test/TSGT120Munich/Documents/tdocs/ [retrieved on Aug. 4, 2003].

(Continued)

*Primary Examiner* — Wei Zhao
*Assistant Examiner* — Sai Aung
(74) *Attorney, Agent, or Firm* — Arent Fox LLP

(57) ABSTRACT

The present methods and apparatus relate to adapting a network configured timer corresponding to a user equipment (UE) capability information procedure for indicating one or more UE capabilities to a network entity, comprising determining a message size of a capability message configured for transmission from the UE to the network entity during the UE capability information procedure; and performing a timer adaptation procedure, wherein the timer adaptation procedure includes adapting the use of the network configured timer based on the message size of the capability message.

26 Claims, 10 Drawing Sheets

(56) References Cited

U.S. PATENT DOCUMENTS

| | | | | |
|---|---|---|---|---|
| 2010/0325502 | A1* | 12/2010 | Lindskog | H04L 1/1657 714/748 |
| 2012/0033554 | A1* | 2/2012 | Shiva | H04W 28/0205 370/235 |
| 2012/0082096 | A1* | 4/2012 | Cave | H04L 1/1841 370/328 |
| 2013/0034014 | A1* | 2/2013 | Jonsson | H04W 24/10 370/253 |

OTHER PUBLICATIONS

International Search Report and Written Opinion—PCT/US2015/023710—ISA/EPO—Jun. 17, 2015. (12 total pages).

Qualcomm Europe: "Multiple UE capabilities procedures", 3GPP Draft; R2-012118, 3rd Generation Partnership Project (3GPP), Mobile Competence Centre, 650, Route Des Lucioles, F-06921 Sophia-Antipolis Cedex, France, vol. RAN WG2, No. Helsinki, Finland; Sep. 4, 2001, XP050118883, [retrieved on Sep. 4, 2001] the whole document.

* cited by examiner

US 9,503,888 B2

ENHANCED TIMER HANDLING MECHANISM

CLAIM OF PRIORITY UNDER 35 U.S.C §119

The present Application for patent claims priority to U.S. Provisional Application No. 61/981,024 entitled "ENHANCED T304 TIMER HANDLING MECHANISM" filed Apr. 17, 2014, assigned to the assignee hereof and hereby expressly incorporated herein by reference.

BACKGROUND

Aspects of the present disclosure relate generally to wireless communication systems, and more particularly, to performing an enhanced timer handling mechanism.

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

In W-CDMA and Long Term Evolution (LTE) networks, a UE capability information message, sometimes refer to a capability message, for example, may be relatively larger, in some instances, in size compared to its normal size. In an aspect, the UE capability information message may be so large that a timer corresponding to an associated capability procedure may expire before receiving a UE capability confirmation message from the UTRAN. In typical solutions that deal with issues arising from large capability messages, since the timer expires, the UE capability information message may need to be transmitted until a retransmission threshold is reached at which point a cell reselection procedure is initiated.

Thus, improvements in performing a timer adaptation procedure in order to handle larger-sized capability messages are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present methods relate to adapting a network configured timer corresponding to a user equipment (UE) capability information procedure for indicating one or more UE capabilities to a network entity, comprising determining a message size of a capability message configured for transmission from the UE to the network entity during the UE capability information procedure; and performing a timer adaptation procedure, wherein the timer adaptation procedure includes adapting the use of the network configured timer based on the message size of the capability message.

The present computer-readable medium storing computer executable code relate to adapting a network configured timer corresponding to a user equipment (UE) capability information procedure for indicating one or more UE capabilities to a network entity, comprising code for determining a message size of a capability message configured for transmission from the UE to the network entity during the UE capability information procedure; and code for performing a timer adaptation procedure, wherein the timer adaptation procedure includes adapting the use of the network configured timer based on the message size of the capability message.

The present apparatus relate to adapting a network configured timer corresponding to a user equipment (UE) capability information procedure for indicating one or more UE capabilities to a network entity, comprising means for determining a message size of a capability message configured for transmission from the UE to the network entity during the UE capability information procedure; and means for performing a timer adaptation procedure, wherein the timer adaptation procedure includes adapting the use of the network configured timer based on the message size of the capability message.

The present apparatus relate to adapting a network configured timer corresponding to a user equipment (UE) capability information procedure for indicating one or more UE capabilities to a network entity, comprising a determining component configured to determine a message size of a capability message configured for transmission from the UE to the network entity during the UE capability information procedure; and a processing component configured to perform a timer adaptation procedure, wherein the timer adaptation procedure includes adapting the use of the network configured timer based on the message size of the capability message.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify corresponding components or actions throughout, where dashed lines may indicate optional components or actions, and wherein.

DETAILED DESCRIPTION

Figure 1:
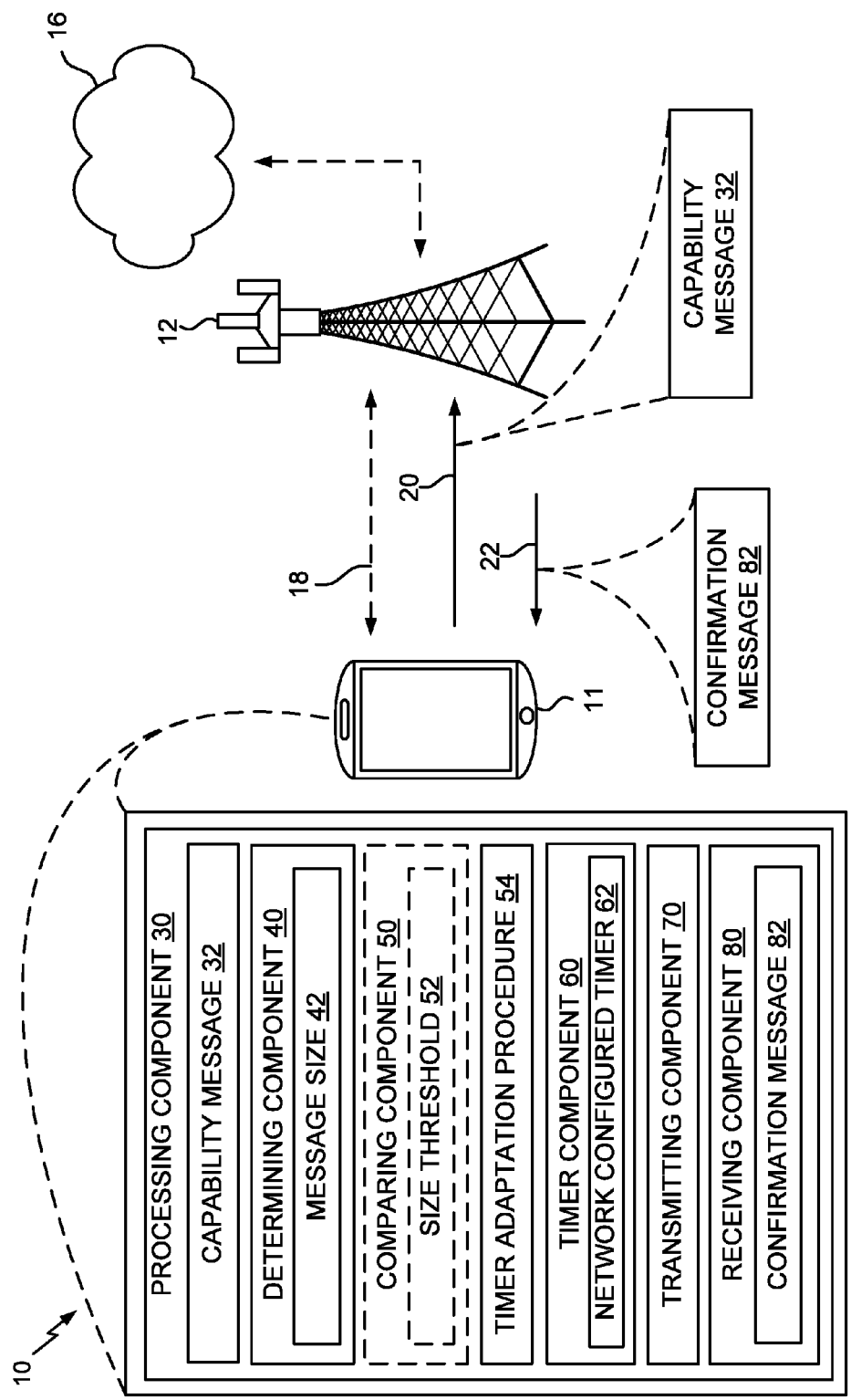
FIG. 1 is a schematic diagram illustrating an example wireless system of aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. In an aspect, the term "component" as used herein may be one of the parts that make up a system, may be hardware or software, and may be divided into other components.

The present aspects generally relate to performing a timer adaptation procedure in order to adapt a network configured timer corresponding to a user equipment (UE) capability information procedure for indicating one or more UE capabilities to a network entity. Specifically, a timer (e.g., a T304 timer) is configured in a Radio Resource Control (RRC) layer (e.g., Layer 3) to cover the procedure of transmitting UE capability information messages and receiving UE capability confirmation messages. For example, a UE may generate and transmit a UE capability information message to the network (e.g., UTRAN). The UE may also initiate the timer (e.g., T304 timer) corresponding to the transmission of the UE capability information message. The timer may be configured by the network with mandatory default maximum values that may range from 10 milliseconds (ms) to 2,000 ms. Because Long Term Evolution (LTE) band information and carrier aggregation is included in the UE capability information message in addition to W-CDMA band capability information, the overall UE capability information may be relatively large in size when compared to those cases in which such additional information is not included in the message. Moreover, the UE capability information message may be transmitted on Signaling Radio Bearers (SRBs), which may be configured as a fixed Protocol Data Units (PDUs) size of 144 bits (or 18 bytes) with up to 16 bytes of information that can be transmitted in every SRB Radio Link Control (RLC) Acknowledged Mode Data (AMD) PDU. As such, a large UE capability message comprising of 648 bytes may need 40 SRB RLC AMD PDUs to be completely transmitted. In certain instances, each of the 40 SRB RLC AMD PDUs may take a SRB transmission time interval (TTI) of 40 ms to be transmitted resulting in 1600 ms just for the complete transmission of the UE capability information message to the network. Due to the length in time for just transmitting the UE capability information message and delays caused due to intermediate Layer 2 RLC ACKs, the timer may expire before the UE capability confirmation message is received by the UE. As such, the UE RRC may be configured to generate another UE capability information message to be transmitted to the network. In some instances, this procedure may be repeated until a counter (e.g., V304) reaches a threshold value (N304). When the counter reaches the threshold value, the UE may be configured to perform a cell reselection procedure.

Accordingly, in some aspects, the present methods and apparatuses may provide an efficient solution, as compared to current solutions, by enabling the UE to perform a timer adaptation procedure in order to adapt a network configured timer corresponding to a UE capability information procedure for indicating one or more UE capabilities to a network entity. As a result, the present methods and apparatuses may prevent the UE from retransmitting UE capability information messages unnecessarily and prevent the UE from performing a cell reselection procedure as a result.

Referring to FIG. 1, in one aspect, a wireless communication system 10 is configured to facilitate enabling the UE to perform a timer adaptation procedure in order to adapt a network configured timer corresponding to a UE capability information procedure for indicating one or more UE capabilities to a network entity. Wireless communication system 10 includes at least one UE 11 that may communicate wirelessly with one or more networks (e.g., network 16) via one or more network entities, including, but not limited to, network entity 12. For example, in an aspect, network entity 12 may be configured to transmit and receive one or more signals via one or more communication channels 18 to/from UE 11.

In certain instances, communication channel 18 may be a Dedicated Control Channel (DCCH) wherein one or more signals 20 and/or 22 are transmitted on. In an aspect, signal 20 may correspond to an RRC message, such as capability message 32 (e.g., UE capability information message) transmitted on SRB1 using UM mode and/or SRB2 using AM mode. As such, signal 20 may be transmitted from UE 11 to network entity 12 via the one or more communication channels 18. Further, signal 22 may be transmitted from network entity 12 to UE 11, and may correspond to an RRC message, such as confirmation message 82 (e.g., UE capability information confirmation message) in response to the capability message 32.

In an aspect, UE 11 may include a processing component 30, which may be configured to perform a timer adaptation procedure 54 in order to handle a larger sized capability message 32 in wireless communication system 10. Specifically, in an aspect, processing component 30 of UE 11 may be configured to generate a capability message 32 to convey UE 11 specific capability information to the network 16. In some instances UE 11 and/or processing component 30 may generate capability message 32 once UE 11 has received a UE capability enquiry message from the network 16, or if UE 11 stored capabilities changed during the RRC connection (e.g., during establishment of communication channel 18).

In a further aspect, processing component 30 may include determining component 40, which may be configured to determine a message size 42 of the capability message 32 that is configured for transmission from UE 11 to the network entity 12. Moreover, processing component 30 may optionally include comparing component 50, which may be configured to compare the message size 42 of the capability message 32 to an optional size threshold 52. For example, determining component 40 may determine that capability message 32 has a message size 42 of 648 bytes, and the size threshold 52 may be configured to a value of 200 bytes. As such, comparing component 50 may compare the 648 bytes of message size 42 to the 200 bytes of the size threshold 52 and establish that message size 42 is greater than the size threshold 52. In some instances, the size threshold 52 may be configured based on the transmit capabilities of UE 11 and the network configured timer 62. For example, UE 11 and/or processing component 30 may configure size threshold 52 to correspond to a hypothetical maximum possible message size 42 of capability message 32 that UE 11 is able to transmit and receive a hypothetical confirmation message 82 within the network configured timer 62.

In another aspect, processing component 30 may be configured to perform a timer adaptation procedure 54, wherein the timer adaptation procedure 54 includes adapting the use of the network configured timer 62 based on the message size 42 of the capability message 32. As such, processing component 30 may perform the timer adaptation procedure 54 in order to either establish a new timer with a larger maximum timer value than the maximum value of the network configured timer 62 and/or delay initiation of the network configured timer 62. In the instance where the timer adaptation procedure 54 establishes a new timer (e.g., configurable timer 98 of FIG. 5) then processing component 30 may configure transmitting component 70 to transmit the capability message 32 via communication channel 18 to network entity 12 with the new timer. In the instance where the timer adaptation procedure 54 delays initiation of the network configured timer 62, processing component 30 may configure transmitting component 70 to transmit the capability message 32 and then configure timer component 60 to initiate the network configured timer 62 once the capability message 32 has been successfully transmitted. As a result, receiving component 80 may receive a confirmation message 82 from the network entity 12 in response to the network entity 12 successfully receiving and processing the capability message 32.

UE 11 may comprise a mobile apparatus and may be referred to as such throughout the present disclosure. Such a mobile apparatus or UE 11 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

Additionally, the one or more wireless nodes, including, but not limited to, network entity 12 of wireless communication system 10, may include one or more of any type of network component, such as an access point, including a base station or node B, a relay, a peer-to-peer device, an authentication, authorization and accounting (AAA) server, a mobile switching center (MSC), a radio network controller (RNC), etc. In a further aspect, the one or more wireless serving nodes of wireless communication system 10 may include one or more small cell base stations, such as, but not limited to a femtocell, picocell, microcell, or any other base station having a relatively small transmit power or relatively small coverage area as compared to a macro base station.

Figure 2:
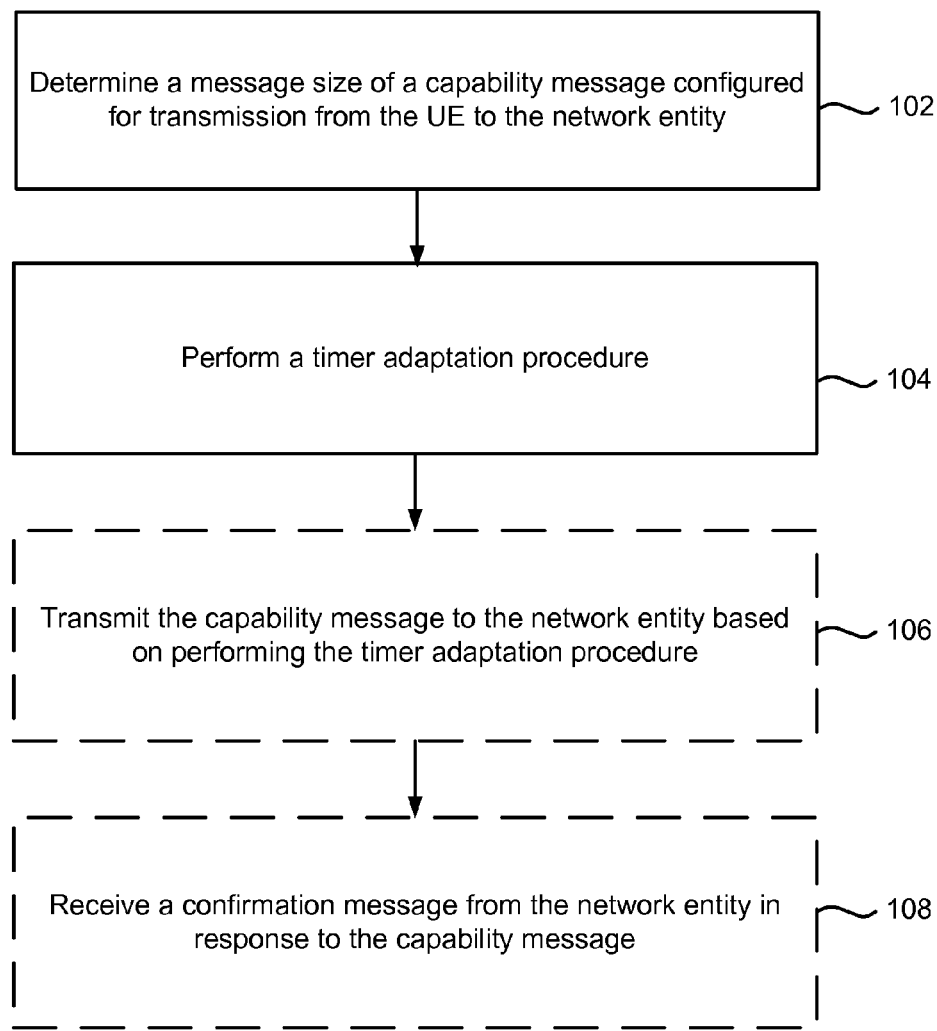
FIG. 2 is a flow diagram illustrating an exemplary method in a wireless communication system.

Referring to FIG. 2, the method is shown and described as a series of acts for purposes of simplicity of explanation. However, it is to be understood and appreciated that the method (and further methods related thereto) are not limited by the order of acts, as some acts may, in accordance with one or more aspects, occur in different orders and/or concurrently with other acts from that shown and described herein. For example, it is to be appreciated that the methods may alternatively be represented as a series of interrelated states or events, such as in a state diagram. Moreover, not all illustrated acts may be required to implement a method in accordance with one or more features described herein.

In an operational aspect, a UE such as UE 11 (FIG. 1) may perform one aspect of a method 100 for enabling the UE to perform the functionality of the timer adaptation procedure 54 (FIG. 1) in order to handle larger-sized capability messages 32 in wireless communication system 10.

At block 102, method 100 may include determining a message size of a capability message configured for transmission from the UE to the network entity. For example, as described herein, UE 11 (FIG. 1) may execute processing component 30 and/or determining component 40 to determine a message size 42 of a capability message 32 configured for transmission from the UE 11 to the network entity 12.

At block 104, method 100 may include performing a timer adaptation procedure. For example, as described herein, UE 11 (FIG. 1) may perform a timer adaptation procedure 54. In some instances, the timer adaptation procedure 54 adapts the use of the network configured timer 62 based on the message size 42 of the capability message 32.

Further, at block 106, method 100 may optionally include transmitting the capability message to the network entity based on performing the timer adaptation procedure. For example, as described herein, UE 11 (FIG. 1) may execute transmitting component 70 to transmit the capability message 32 to the network entity 12 based on performing the timer adaptation procedure 54.

Subsequently, at block 108, method 100 may optionally include receiving a confirmation message from the network entity in response to the capability message. For example, as described herein, UE 11 (FIG. 1) may execute receiving component 80 to receive a confirmation message 82 from the network entity 12 in response to the capability message 32.

Figure 3:
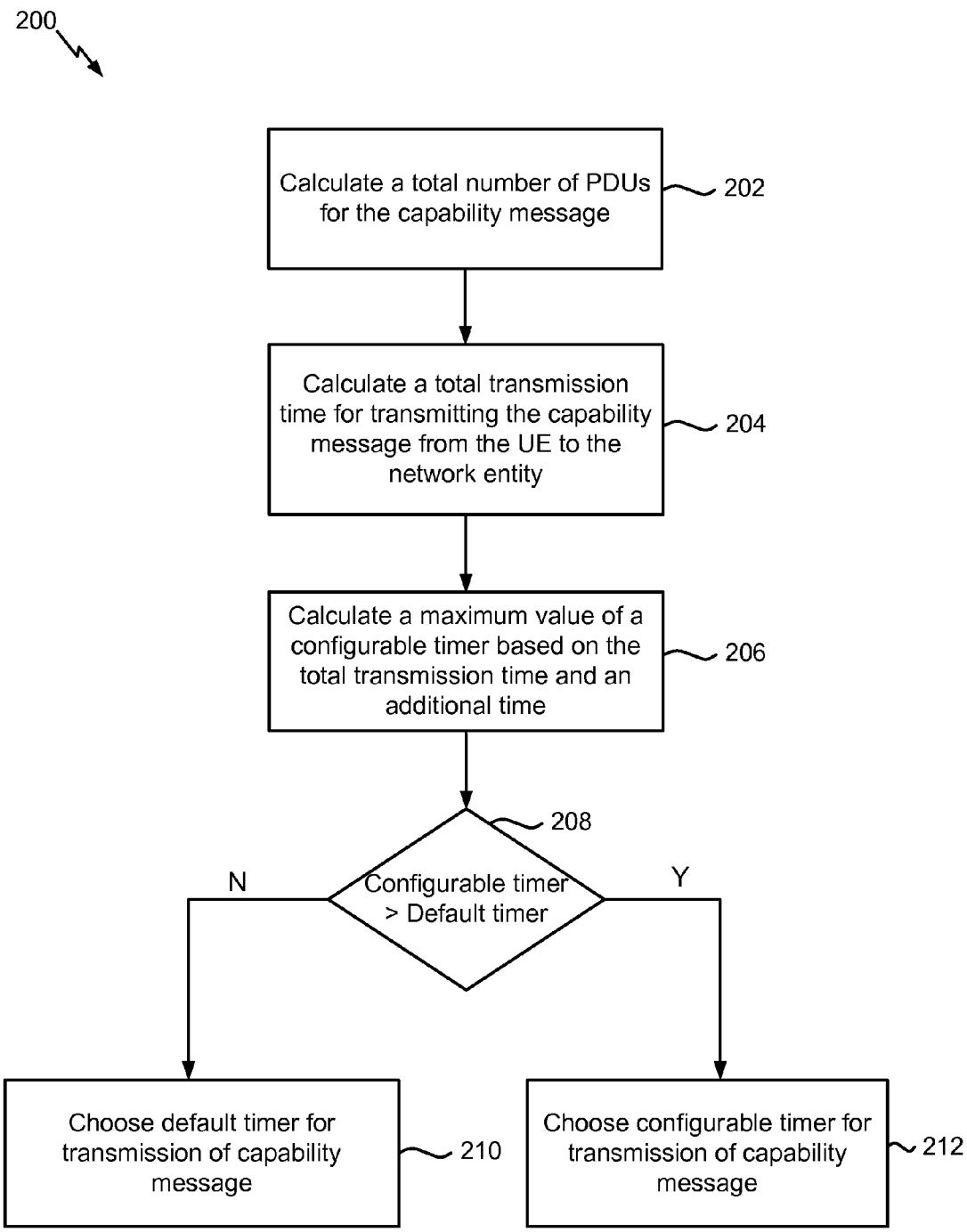
FIG. 3 is a flow diagram illustrating another exemplary method in a wireless system.
Figure 5:
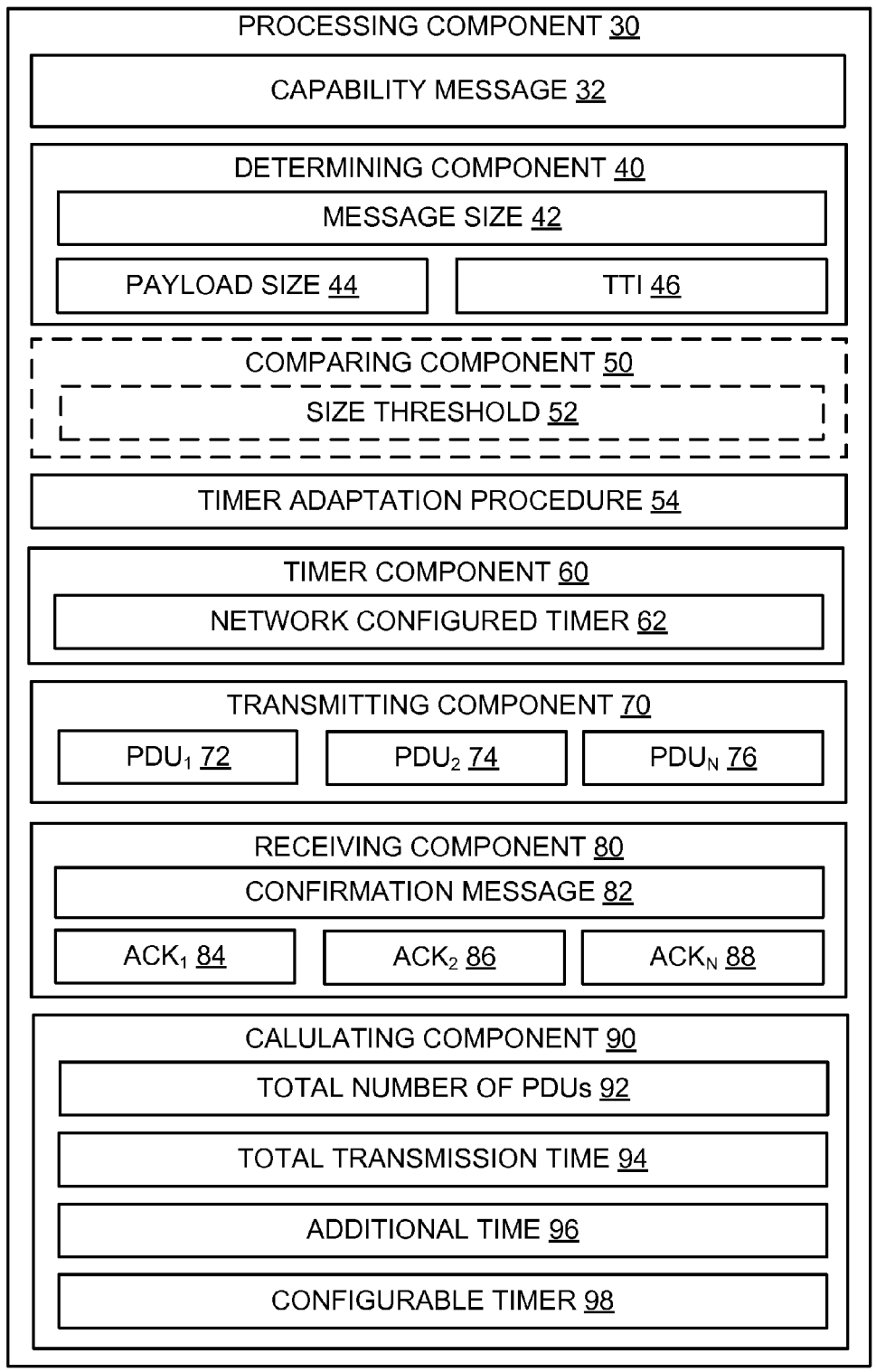
FIG. 5 is a schematic diagram illustrating an example of an aspect of cell selection component of the present disclosure.

Referring to FIGS. 3 and 5, an example of one or more operations of an aspect of processing component 30 (FIG. 1) according to the present apparatus and methods are described with reference to one or more methods and one or more components that may perform the actions or functions of these methods. Although the operations described below are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

In a particular aspect, a method 200 of wireless communication includes, at block 202 (FIG. 3), calculating a total number of Protocol Data Units (PDUs) of the capability message. In an aspect, for instance, processing component 30 may execute calculating component 90 (FIG. 5) to calculate a total number of PDUs 92 of the capability message 32. For example, if at block 106 (FIG. 2) of method 100, processing component 30 is configured to perform the timer adaptation procedure 54 corresponding to establishing a new timer (e.g., configurable timer 98) with a larger timer value than the network configured timer 62 then calculating component 90 may calculate the total number of PDUs 92 of the capability message 32 based on the message size 42 of the capability message 32 and a payload size 44 of a Radio Link Control (RLC) Acknowledged Mode (AM) PDU. In some instances, the determining component 40 may determine the payload size 44 of the RLC AM PDU. In certain instances, calculating component 90 may divide the message size 42 of the capability message 32 by the payload size 44 of the RLC AM PDU in order to calculate the total number of PDUs 92.

In another aspect, a method 200 of wireless communication includes, at block 204 (FIG. 3), calculating a total transmission time for transmitting the UE capability message from the UE to the network entity. In an aspect, for instance, processing component 30 may execute calculating component 90 (FIG. 5) to calculate a total transmission time 94 for transmitting the capability message 32 from the UE 11 to the network entity 12. For example, calculating component 90 may calculate the total transmission time 94 based on the total number of PDUs 92 of the capability message 32 and a transmission time interval (TTI) 46 for each of the PDUs of the capability message 32. In some instances, the determining component 40 may determine the TTI 46 for each of the PDUs of the capability message 32. In certain instances, calculating component 90 may multiply the total number of PDUs 92 of the capability message 32 by the TTI 46 for each of the PDUs of the capability message 32 in order to calculate the total transmission time 94.

In a further aspect, a method 200 of wireless communication includes, at block 206 (FIG. 3), calculating a maximum value of a configurable timer based on the total transmission time and an additional time. In an aspect, for instance, processing component 30 may execute calculating component 90 (FIG. 5) to calculate a maximum value of a configurable timer 98 based on the total transmission time 94 and an additional time 96. For example, calculating component 90 may establish the additional time 96 based on a processing time of the capability message 32 at the network entity 12 and a time required for transmitting a capability message 32 response from the network entity 12 to the UE 11. In some instances, calculating component 90 may calculate the maximum value of the configurable timer 98 by adding the total transmission time 94 and the additional time 96.

Additionally, in an aspect, a method 200 of wireless communication includes, at block 206 (FIG. 3), determining whether the maximum value of a configurable timer is greater than the maximum value of a network configured timer. In an aspect, for instance, processing component 30 may execute timer component 60 (FIG. 5) to determine whether the maximum value of the configurable timer 98 is greater than the maximum value of the network configured timer 62. For example, once the maximum value of the configurable timer 98 is calculated, calculating component 90 may transmit the configurable timer 98 to timer component 60 so that timer component 60 may choose between configurable timer 98 and the network configured timer 62. In instances where the message size 42 of the capability message 32 is small enough for the network configured timer 62 to handle properly, the maximum value of the configurable timer 98 will not be greater than the maximum value of the network configured timer 62, so, in block 210, timer component 60 may choose network configured timer 62 for transmission of capability message 32. In instances where the message size 42 of the capability message 32 is too large for the network configured timer 62 to handle properly, the maximum value of the configurable timer 98 will be greater than the maximum value of the network configured timer 62, so, in block 212, timer component 60 may choose configurable timer 98 for transmission of capability message 32. As such, depending on the message size 42 of the capability message 32, processing component 30 may either choose the network configured timer 62 to properly handle the capability message 32 or calculate a maximum of the configurable timer 98 to properly handle the capability message 32.

Figure 4:
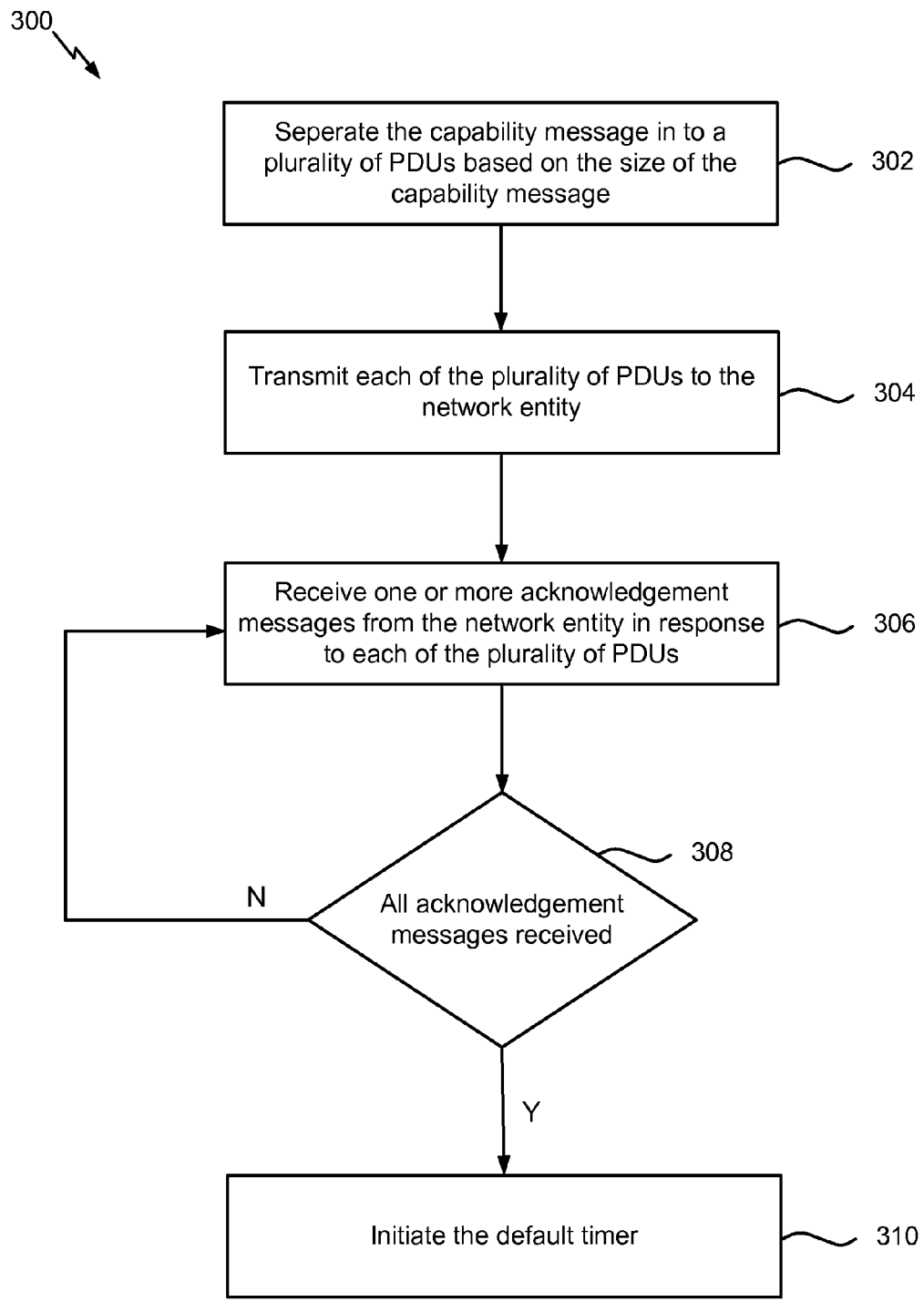
FIG. 4 is a flow diagram illustrating another exemplary method in a wireless system.

Referring to FIGS. 4 and 5, an example of one or more operations of an aspect of processing component 30 (FIG. 1) according to the present apparatus and methods are described with reference to one or more methods and one or more components that may perform the actions or functions of these methods. Although the operations described below are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

In a particular aspect, a method 300 of wireless communication includes, at block 302 (FIG. 4), separating the capability message in to a plurality of PDUs based on the message size of the capability message. In an instance, the capability message may be separated, split, divided, partitioned, broken up, and/or parted. In an aspect, for instance, processing component 30 may execute transmitting component 70 (FIG. 5) to split the capability message 32 in to a plurality of PDUs (e.g., PDU$_1$ 72, PDU$_2$ 74, and PDU$_N$ 76) based on the message size 42 of the capability message 32. For example, if at block 106 (FIG. 2) of method 100, processing component 30 is configured to perform the functionality of the timer adaptation procedure 54 corresponding to delaying initiating the network configured timer 62 until successful transmission of the capability message 32, then transmitting component 70 may split the capability message 32 in to a plurality of PDUs. In some instances, the number of PDUs is directly proportional to the message size 42 of the capability message 32 (e.g., the greater the message size 42 the greater the number of PDUs).

In a further aspect, method 300 of wireless communication includes, at block 304 (FIG. 4), transmitting each of the plurality of PDUs to the network entity. In an aspect, for instance, processing component 30 may execute transmitting component 70 (FIG. 5) to transmit each of the plurality of PDUs (e.g., PDU$_1$ 72, PDU$_2$ 74, and PDU$_N$ 76) to the network entity 12. For example, the plurality of PDUs may be transmitted via communication channel 18 (e.g., DCCH) as signal 20 (FIG. 1). Moreover, each PDU may be transmitted based on its corresponding TTI 46.

In another aspect, a method 300 of wireless communication includes, at block 306 (FIG. 4), receive one or more acknowledgment messages from the network entity in response to each of the plurality of PDUs. In an aspect, for instance, processing component 30 may execute receiving component 80 (FIG. 5) to receive one or more acknowledgment messages (e.g., $ACK_1$ 84, $ACK_2$ 86, and $ACK_N$ 88) from the network entity 12 in response to each of the plurality of PDUs (e.g., $PDU_1$ 72, $PDU_2$ 74, and $PDU_N$ 76). For example, network entity 12 may receive a PDU (e.g., $PDU_1$ 72), and then transmit a correspond ACK (e.g., $ACK_1$ 84) to UE 11 and/or receiving component 80. In certain instances, the acknowledgment messages correspond to the successful transmission of each of the plurality of PDUs. In other instances, receiving component 80 may optionally receive a negative acknowledgment message (e.g., NACK), and as such, the UE 11 may retransmit the corresponding PDU that the NACK was received for.

Further, in an aspect, a method 300 of wireless communication includes, at block 308 (FIG. 4), determining whether all of the one or more acknowledgment messages correspond to each of the plurality of PDUs are received. In an aspect, for instance, processing component 30 may execute receiving component 80 (FIG. 5) to determine whether all of the one or more acknowledgment messages (e.g., $ACK_1$ 84, $ACK_2$ 86, and $ACK_N$ 88) correspond to each of the plurality of PDUs (e.g., $PDU_1$ 72, $PDU_2$ 74, and $PDU_N$ 76) are received. For example, processing component 30 and/or receiving component 80 may be configured to wait until all ACKs corresponding to the PDUs of the capability message 32 are received before indicating that the capability message 32 was successfully transmitted. As such, if it is determined that all the ACKs have not been received by receiving component 80 then method 300 may return to block 306. Moreover, if it is determined that all the ACKs have been received by receiving component 80 then method 300 may proceed to block 310.

Additionally, in an aspect, method 300 of wireless communication includes, at block 310 (FIG. 4), initiating a network configured timer. In an aspect, for instance, processing component 30 may execute timer component 60 (FIG. 5) to initiate the network configured timer 62 in response to the successful transmission of the capability message 32. In certain instances, the network configured timer 62 may be initiated in response to receiving the last ACK (e.g., $ACK_N$ 88) corresponding to the final PDU (e.g., $PDU_N$ 76) of the plurality of PDUs. As such, once the network configured timer 62 is initiated, the capability message 32 has been successfully transmitted and is currently being processed by the network entity 12. Therefore, during normal operation, the confirmation message 82 should be received by the receiving component 80 before the network configured timer 62 expires.

Figure 6:
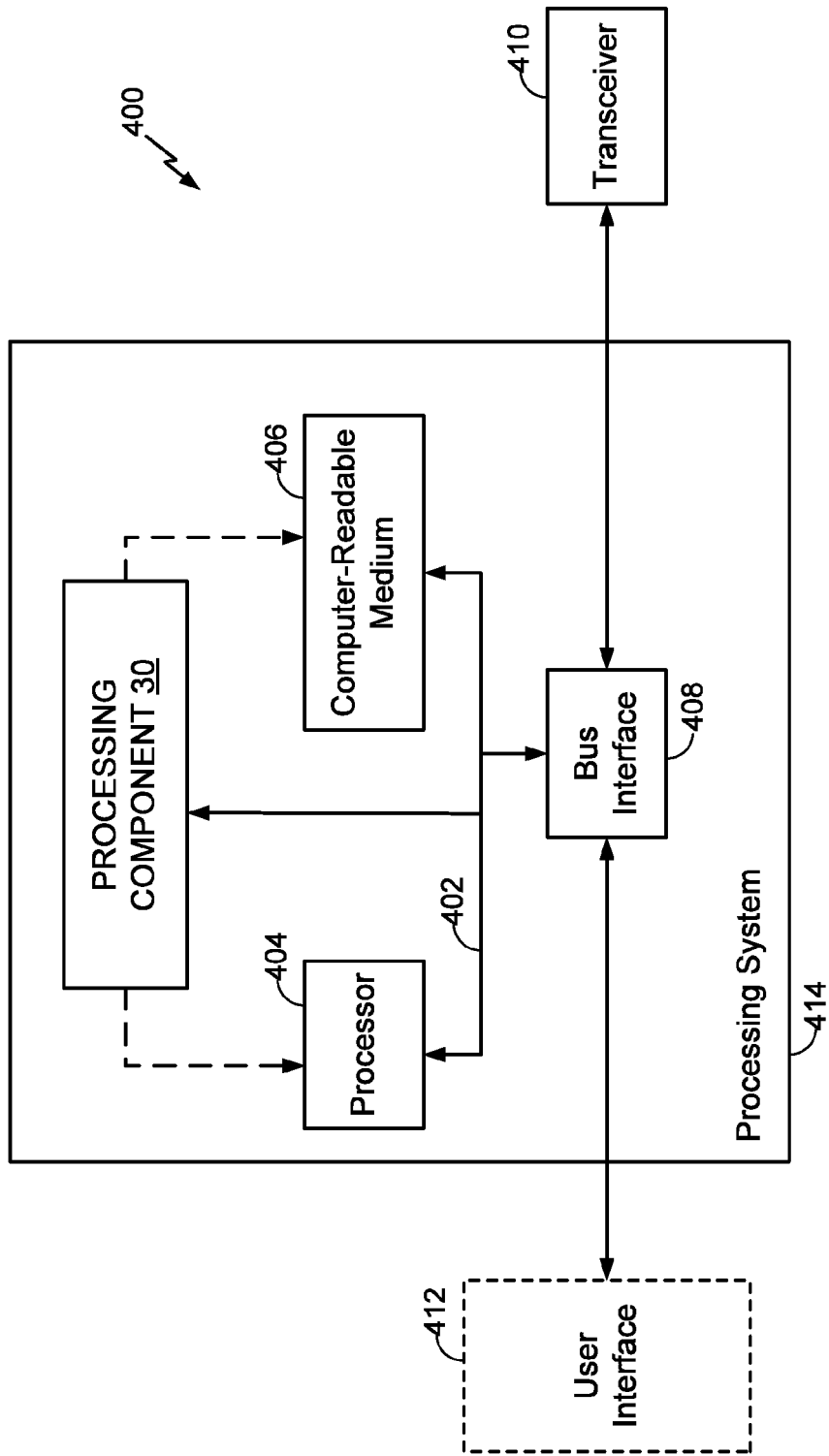
FIG. 6 is a diagram illustrating an example of a hardware implementation for an apparatus employing a processing system.

FIG. 6 is a conceptual diagram illustrating an example of a hardware implementation for an apparatus 400 employing a processing system 414, which may be included in a UE such as UE 11 (FIG. 1) configured to execute processing component 30. In this example, the processing system 414 may be implemented with a bus architecture, represented generally by the bus 402. The bus 402 may include any number of interconnecting buses and bridges depending on the specific application of the processing system 414 and the overall design constraints. The bus 402 links together various circuits including one or more processors, represented generally by the processor 404, and computer-readable media, represented generally by the computer-readable medium 406. The bus 402 may also link various other circuits such as timing sources, peripherals, voltage regulators, and power management circuits, which are well known in the art, and therefore, will not be described any further. A bus interface 408 provides an interface between the bus 402 and a transceiver 410. The transceiver 410 provides a means for communicating with various other apparatus over a transmission medium. Depending upon the nature of the apparatus, a user interface 412 (e.g., keypad, display, speaker, microphone, joystick) may also be provided.

The processor 404 is responsible for managing the bus 402 and general processing, including the execution of software stored on the computer-readable medium 406. The software, when executed by the processor 404, causes the processing system 414 to perform the various functions described infra for any particular apparatus. The computer-readable medium 406 may also be used for storing data that is manipulated by the processor 404 when executing software.

Figure 7:
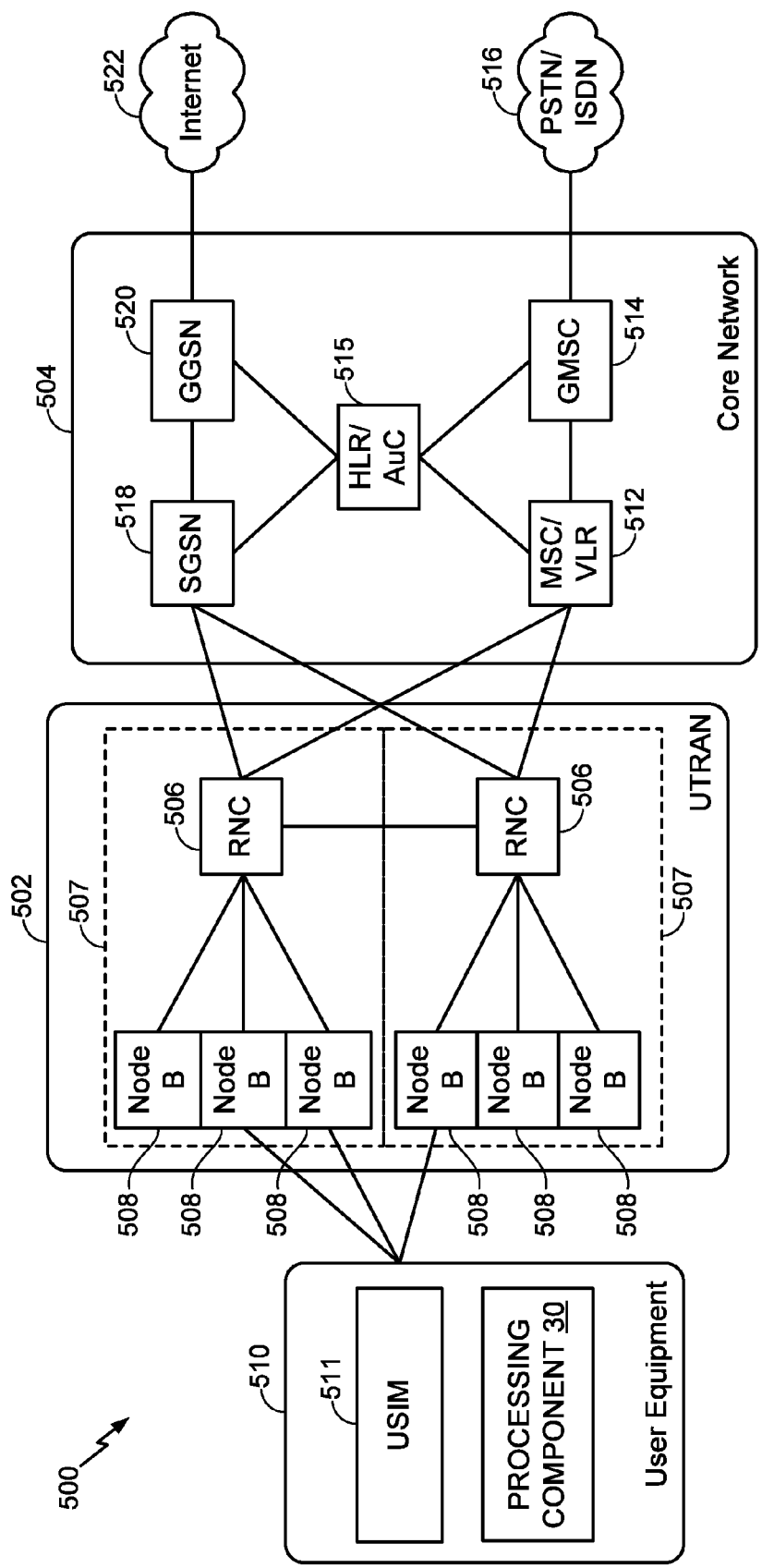
FIG. 7 is a block diagram conceptually illustrating an example of a telecommunications system.

The various concepts presented throughout this disclosure may be implemented across a broad variety of telecommunication systems, network architectures, and communication standards. By way of example and without limitation, the aspects of the present disclosure illustrated in FIG. 7 are presented with reference to a UMTS system 500 employing a W-CDMA air interface. A UMTS network includes three interacting domains: a Core Network (CN) 504, a UMTS Terrestrial Radio Access Network (UTRAN) 502, and User Equipment (UE) 510, which may be the same or similar to UE 11 (FIG. 1) and configured to execute processing component 30. In this example, the UTRAN 502 provides various wireless services including telephony, video, data, messaging, broadcasts, and/or other services. The UTRAN 502 may include a plurality of Radio Network Subsystems (RNSs) such as an RNS 507, each controlled by a respective Radio Network Controller (RNC) such as an RNC 506. Here, the UTRAN 502 may include any number of RNCs 506 and RNSs 507 in addition to the RNCs 506 and RNSs 507 illustrated herein. The RNC 506 is an apparatus responsible for, among other things, assigning, reconfiguring and releasing radio resources within the RNS 507. The RNC 506 may be interconnected to other RNCs (not shown) in the UTRAN 502 through various types of interfaces such as a direct physical connection, a virtual network, or the like, using any suitable transport network.

Communication between a UE 510 and a Node B 508 may be considered as including a physical (PHY) layer and a medium access control (MAC) layer. Further, communication between a UE 510 and an RNC 506 by way of a respective Node B 508 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in Radio Resource Control (RRC) Protocol Specification, 3GPP TS 25.331 v9.1.0, incorporated herein by reference.

The geographic region covered by the SRNS 507 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 508 are shown in each SRNS 507; however, the SRNSs 507 may include any number of wireless Node Bs. The Node Bs 508 provide wireless access points to a core network (CN) 504 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 510 may further include a universal subscriber identity module (USIM) 511, which contains a user's subscription information to a network. For illustrative purposes, one UE 510 is shown in communication with a number of the Node Bs 508. The downlink (DL), also called the forward link, refers to the communication link from a Node B 508 to a UE 510, and the uplink (UL), also called the reverse link, refers to the communication link from a UE 510 to a Node B 508.

The core network 504 interfaces with one or more access networks, such as the UTRAN 502. As shown, the core network 504 is a GSM core network. However, as those skilled in the art will recognize, the various concepts presented throughout this disclosure may be implemented in a RAN, or other suitable access network, to provide UEs with access to types of core networks other than GSM networks.

The core network 504 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the core network 504 supports circuit-switched services with a MSC 512 and a GMSC 514. In some applications, the GMSC 514 may be referred to as a media gateway (MGW). One or more RNCs, such as the RNC 506, may be connected to the MSC 512. The MSC 512 is an apparatus that controls call setup, call routing, and UE mobility functions. The MSC 512 also includes a visitor location register (VLR) that contains subscriber-related information for the duration that a UE is in the coverage area of the MSC 512. The GMSC 514 provides a gateway through the MSC 512 for the UE to access a circuit-switched network 516. The core network 504 includes a home location register (HLR) 515 containing subscriber data, such as the data reflecting the details of the services to which a particular user has subscribed. The HLR is also associated with an authentication center (AuC) that contains subscriber-specific authentication data. When a call is received for a particular UE, the GMSC 514 queries the HLR 515 to determine the UE's location and forwards the call to the particular MSC serving that location.

The core network 504 also supports packet-data services with a serving GPRS support node (SGSN) 518 and a gateway GPRS support node (GGSN) 520. GPRS, which stands for General Packet Radio Service, is designed to provide packet-data services at speeds higher than those available with standard circuit-switched data services. The GGSN 520 provides a connection for the UTRAN 502 to a packet-based network 522. The packet-based network 522 may be the Internet, a private data network, or some other suitable packet-based network. The primary function of the GGSN 520 is to provide the UEs 510 with packet-based network connectivity. Data packets may be transferred between the GGSN 520 and the UEs 510 through the SGSN 518, which performs primarily the same functions in the packet-based domain as the MSC 512 performs in the circuit-switched domain.

The UMTS air interface is a spread spectrum Direct-Sequence Code Division Multiple Access (DS-CDMA) system. The spread spectrum DS-CDMA spreads user data through multiplication by a sequence of pseudorandom bits called chips. The W-CDMA air interface for UMTS is based on such direct sequence spread spectrum technology and additionally calls for a frequency division duplexing (FDD). FDD uses a different carrier frequency for the uplink (UL) and downlink (DL) between a Node B 508 and a UE 510. Another air interface for UMTS that utilizes DS-CDMA, and uses time division duplexing, is the TD-SCDMA air interface. Those skilled in the art will recognize that although various examples described herein may refer to a WCDMA air interface, the underlying principles are equally applicable to a TD-SCDMA air interface.

Figure 8:
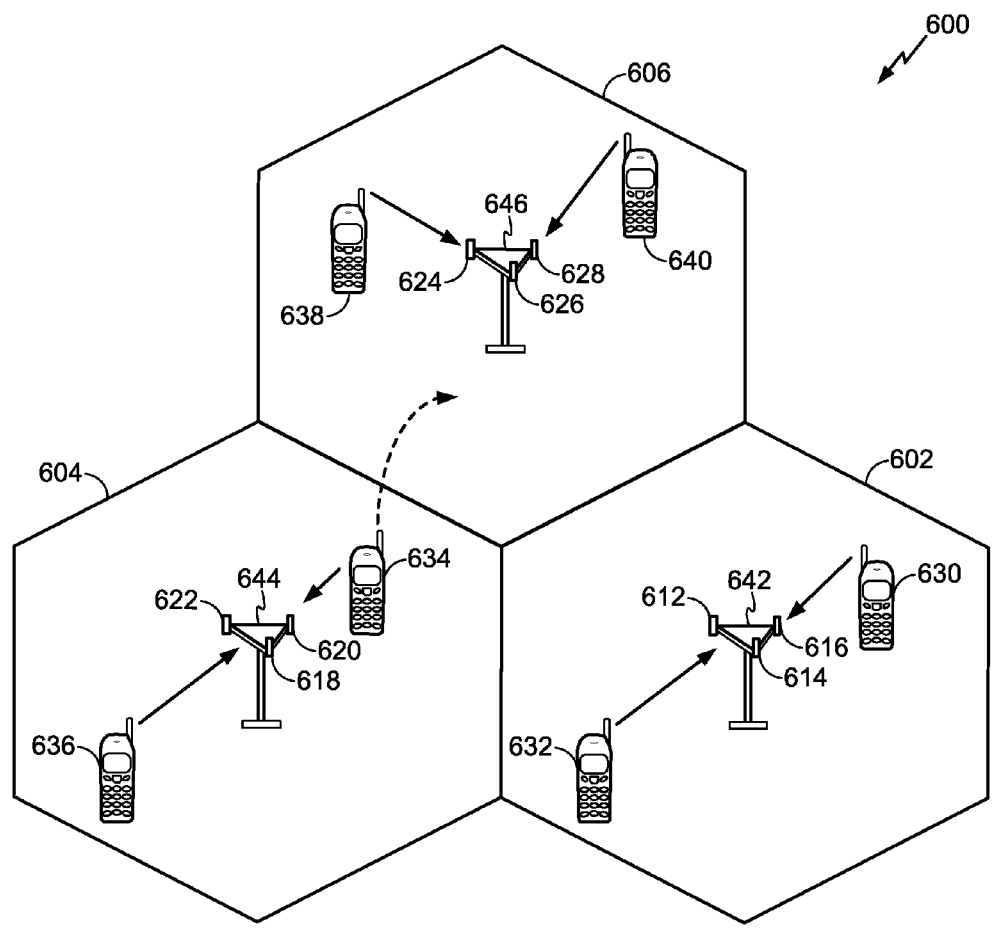
FIG. 8 is a conceptual diagram illustrating an example of an access network.

Referring to FIG. 8, an access network 600 in a UTRAN architecture is illustrated. The multiple access wireless communication system includes multiple cellular regions (cells), including cells 602, 604, and 606, each of which may include one or more sectors. The multiple sectors can be formed by groups of antennas with each antenna responsible for communication with UEs in a portion of the cell. For example, in cell 602, antenna groups 612, 614, and 616 may each correspond to a different sector. In cell 604, antenna groups 618, 620, and 622 each correspond to a different sector. In cell 606, antenna groups 624, 626, and 628 each correspond to a different sector. The cells 602, 604 and 606 may include several wireless communication devices, e.g., User Equipment or UEs, such as UE 11 (FIG. 1) configured to execute processing component 30, which may be in communication with one or more sectors of each cell 602, 604 or 606. For example, UEs 630 and 632 may be in communication with Node B 642, UEs 634 and 636 may be in communication with Node B 644, and UEs 638 and 640 can be in communication with Node B 646. Here, each Node B 642, 644, 646 is configured to provide an access point to a core network 504 (see FIG. 7) for all the UEs 630, 632, 634, 636, 638, 640 in the respective cells 602, 604, and 606.

As the UE 634 moves from the illustrated location in cell 604 into cell 606, a serving cell change (SCC) or handover may occur in which communication with the UE 634 transitions from the cell 604, which may be referred to as the source cell, to cell 606, which may be referred to as the target cell. Management of the handover procedure may take place at the UE 634, at the Node Bs corresponding to the respective cells, at a radio network controller 506 (see FIG. 7), or at another suitable node in the wireless network. For example, during a call with the source cell 604, or at any other time, the UE 634 may monitor various parameters of the source cell 604 as well as various parameters of neighboring cells such as cells 606 and 602. Further, depending on the quality of these parameters, the UE 634 may maintain communication with one or more of the neighboring cells. During this time, the UE 634 may maintain an Active Set, that is, a list of cells that the UE 634 is simultaneously connected to (i.e., the UTRA cells that are currently assigning a downlink dedicated physical channel DPCH or fractional downlink dedicated physical channel F-DPCH to the UE 634 may constitute the Active Set).

The modulation and multiple access scheme employed by the access network 600 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 9.

Figure 9:
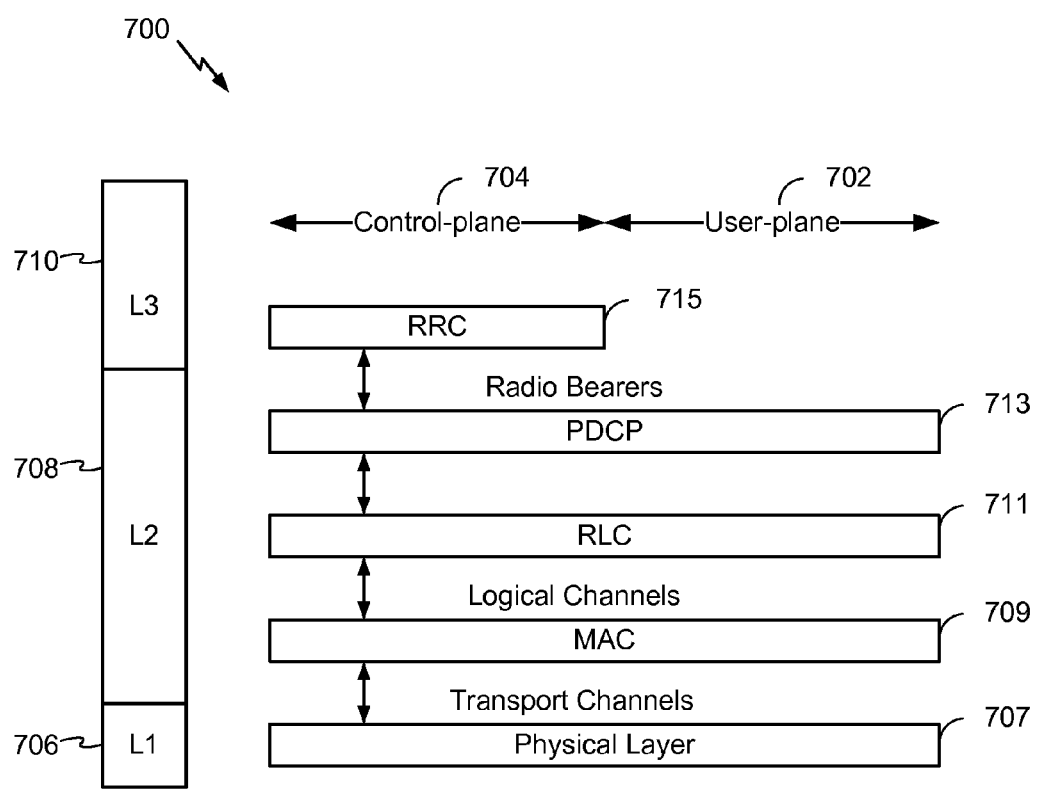
FIG. 9 is a conceptual diagram illustrating an example of a radio protocol architecture for the user and control plane.

Referring to FIG. 9 an example radio protocol architecture 700 relates to the user plane 702 and the control plane 704 of a user equipment (UE) or node B/base station. For example, architecture 700 may be included in a UE such as UE 11 (FIG. 1) configured to execute processing component 30. The radio protocol architecture 700 for the UE and node B is shown with three layers: Layer 1 706, Layer 2 708, and Layer 3 710. Layer 1 706 is the lowest lower and implements various physical layer signal processing functions. As such, Layer 1 706 includes the physical layer 707. Layer 2 (L2 layer) 708 is above the physical layer 707 and is responsible for the link between the UE and node B over the physical layer 707. Layer 3 (L3 layer) 710 includes a radio resource control (RRC) sublayer 715. The RRC sublayer 715 handles the control plane signaling of Layer 3 between the UE and the UTRAN.

In the user plane, the L2 layer 708 includes a media access control (MAC) sublayer 709, a radio link control (RLC) sublayer 711, and a packet data convergence protocol (PDCP) 713 sublayer, which are terminated at the node B on the network side. Although not shown, the UE may have several upper layers above the L2 layer 708 including a network layer (e.g., IP layer) that is terminated at a PDN gateway on the network side, and an application layer that is terminated at the other end of the connection (e.g., far end UE, server, etc.).

The PDCP sublayer 713 provides multiplexing between different radio bearers and logical channels. The PDCP sublayer 713 also provides header compression for upper layer data packets to reduce radio transmission overhead, security by ciphering the data packets, and handover support for UEs between node Bs. The RLC sublayer 711 provides segmentation and reassembly of upper layer data packets, retransmission of lost data packets, and reordering of data packets to compensate for out-of-order reception due to hybrid automatic repeat request (HARQ). The MAC sublayer 709 provides multiplexing between logical and transport channels. The MAC sublayer 709 is also responsible for allocating the various radio resources (e.g., resource blocks) in one cell among the UEs. The MAC sublayer 709 is also responsible for HARQ operations.

Figure 10:
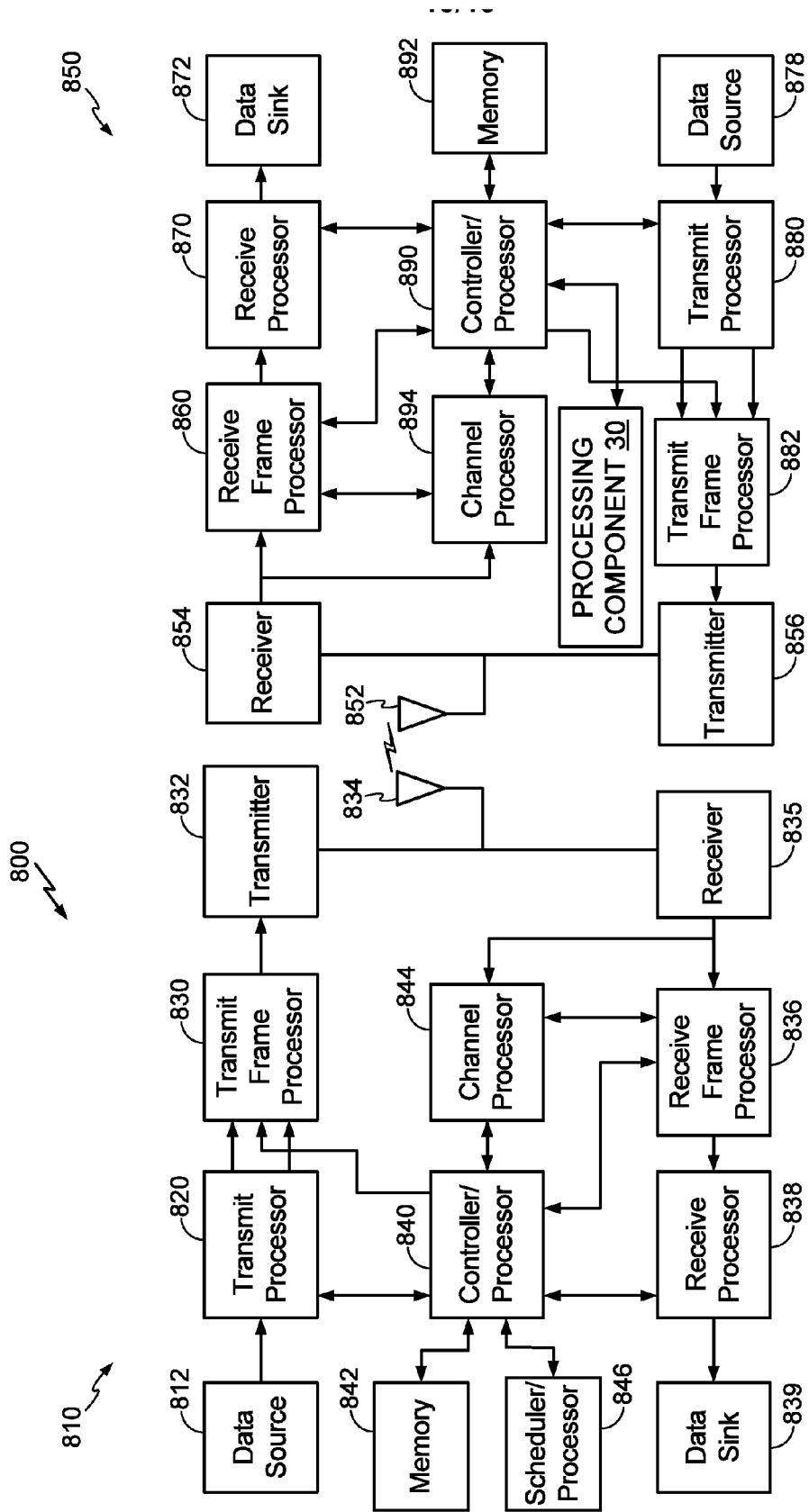
FIG. 10 is a block diagram conceptually illustrating an example of a Node B in communication with a UE in a telecommunications system.

FIG. 10 is a block diagram of a Node B 810 in communication with a UE 850, where the Node B 810 may be the Node B 508 in FIG. 7, and the UE 850 may be the UE 510 in FIG. 7 or may be UE 11 (FIG. 1) and configured to execute processing component 30. In the downlink communication, a transmit processor 820 may receive data from a data source 812 and control signals from a controller/processor 840. The transmit processor 820 provides various signal processing functions for the data and control signals, as well as reference signals (e.g., pilot signals). For example, the transmit processor 820 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 844 may be used by a controller/processor 840 to determine the coding, modulation, spreading, and/or scrambling schemes for the transmit processor 820. These channel estimates may be derived from a reference signal transmitted by the UE 850 or from feedback from the UE 850. The symbols generated by the transmit processor 820 are provided to a transmit frame processor 830 to create a frame structure. The transmit frame processor 830 creates this frame structure by multiplexing the symbols with information from the controller/processor 840, resulting in a series of frames. The frames are then provided to a transmitter 832, which provides various signal conditioning functions including amplifying, filtering, and modulating the frames onto a carrier for downlink transmission over the wireless medium through antenna 834. The antenna 834 may include one or more antennas, for example, including beam steering bidirectional adaptive antenna arrays or other similar beam technologies.

At the UE 850, a receiver 854 receives the downlink transmission through an antenna 852 and processes the transmission to recover the information modulated onto the carrier. The information recovered by the receiver 854 is provided to a receive frame processor 860, which parses each frame, and provides information from the frames to a channel processor 894 and the data, control, and reference signals to a receive processor 870. The receive processor 870 then performs the inverse of the processing performed by the transmit processor 820 in the Node B 810. More specifically, the receive processor 870 descrambles and despreads the symbols, and then determines the most likely signal constellation points transmitted by the Node B 810 based on the modulation scheme. These soft decisions may be based on channel estimates computed by the channel processor 894. The soft decisions are then decoded and deinterleaved to recover the data, control, and reference signals. The CRC codes are then checked to determine whether the frames were successfully decoded. The data carried by the successfully decoded frames will then be provided to a data sink 872, which represents applications running in the UE 850 and/or various user interfaces (e.g., display). Control signals carried by successfully decoded frames will be provided to a controller/processor 890. When frames are unsuccessfully decoded by the receiver processor 870, the controller/processor 890 may also use an acknowledgement (ACK) and/or negative acknowledgement (NACK) protocol to support retransmission requests for those frames.

In the uplink, data from a data source 878 and control signals from the controller/processor 890 are provided to a transmit processor 880. The data source 878 may represent applications running in the UE 850 and various user interfaces (e.g., keyboard). Similar to the functionality described in connection with the downlink transmission by the Node B 810, the transmit processor 880 provides various signal processing functions including CRC codes, coding and interleaving to facilitate FEC, mapping to signal constellations, spreading with OVSFs, and scrambling to produce a series of symbols. Channel estimates, derived by the channel processor 894 from a reference signal transmitted by the Node B 810 or from feedback contained in the midamble transmitted by the Node B 810, may be used to select the appropriate coding, modulation, spreading, and/or scrambling schemes. The symbols produced by the transmit processor 880 will be provided to a transmit frame processor 882 to create a frame structure. The transmit frame processor 882 creates this frame structure by multiplexing the symbols with information from the controller/processor 890, resulting in a series of frames. The frames are then provided to a transmitter 856, which provides various signal conditioning functions including amplification, filtering, and modulating the frames onto a carrier for uplink transmission over the wireless medium through the antenna 852.

The uplink transmission is processed at the Node B 810 in a manner similar to that described in connection with the receiver function at the UE 850. A receiver 835 receives the uplink transmission through the antenna 834 and processes the transmission to recover the information modulated onto the carrier. The information recovered by the receiver 835 is provided to a receive frame processor 836, which parses each frame, and provides information from the frames to the channel processor 844 and the data, control, and reference signals to a receive processor 838. The receive processor 838 performs the inverse of the processing performed by the transmit processor 880 in the UE 850. The data and control signals carried by the successfully decoded frames may then be provided to a data sink 839 and the controller/processor, respectively. If some of the frames were unsuccessfully decoded by the receive processor, the controller/processor 840 may also use an acknowledgement (ACK) and/or negative acknowledgement (NACK) protocol to support retransmission requests for those frames.

The controller/processors 840 and 890 may be used to direct the operation at the Node B 810 and the UE 850, respectively. For example, the controller/processors 840 and 890 may provide various functions including timing, peripheral interfaces, voltage regulation, power management, and other control functions. The computer readable media of memories 842 and 892 may store data and software for the Node B 810 and the UE 850, respectively. A scheduler/processor 846 at the Node B 810 may be used to allocate resources to the UEs and schedule downlink and/or uplink transmissions for the UEs.

Aspects and examples of the present apparatus and methods are described and illustrated in the attached Appendix. Several aspects of a telecommunications system have been presented with reference to an HSPA system. As those skilled in the art will readily appreciate, various aspects described throughout this disclosure may be extended to other telecommunication systems, network architectures and communication standards.

By way of example, various aspects may be extended to other UMTS systems such as W-CDMA, TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of adapting a network configured timer corresponding to a user equipment (UE) capability information procedure for indicating one or more UE capabilities to a network entity, comprising:
determining a message size of a capability message configured for transmission from the UE to the network entity during the UE capability information procedure, wherein the capability message indicates the one or more UE capabilities to the network entity; and
performing a timer adaptation procedure, wherein the timer adaptation procedure includes adapting the use of the network configured timer based on the message size of the capability message, wherein the timer adaptation procedure further comprises:
calculating a total number of Protocol Data Units (PDUs) of the capability message and a total transmission time for transmission of the capability message from the UE to the network entity;
calculating a maximum value of a configurable timer based on the total transmission time and an additional time corresponding to a return time of a capability confirmation message from the network entity, wherein the additional time further corresponds to a processing time of the capability message at the network entity in addition to a time required for transmitting a capability message response from the network entity to the UE; and
choosing the configurable timer for transmission of the capability message when the maximum value of the configurable timer is greater than a maximum value of the network configured timer.

2. The method of claim 1, wherein the total number of PDUs of the capability message is calculated based on the message size of the capability message and a payload size of a Radio Link Control (RLC) Acknowledged Mode (AM) PDU.

3. The method of claim 1, wherein the total transmission time for transmission of the capability message from the UE to the network entity is calculated based on the total number of PDUs of the capability message and a transmission time interval (TTI) for each of the PDUs of the capability message.

4. The method of claim 1, further comprising choosing the network configured timer for transmission of the capability message when the maximum value of the configurable timer is less than or equal to the maximum value of the network configured timer.

5. The method of claim 1, further comprising:
transmitting the capability message to the network entity for processing based on the configurable timer; and
receiving the capability confirmation message from the network entity in response to the network entity successfully processing the capability message.

6. The method of claim 1, wherein the timer adaptation procedure further comprises:
transmitting the capability message from the UE to the network entity for processing;
determining that the capability message was successfully transmitted to the network entity by the UE; and
initiating the network configured timer in response to the successful transmission of the capability message.

7. The method of claim 6, wherein transmitting the capability message from the UE to the network entity for processing further comprises:
separating the capability message in to a plurality of PDUs based on the size of the capability message; and
transmitting each of the plurality of PDUs to the network entity.

8. The method of claim 7, wherein determining that the capability message was successfully transmitted to the network entity further comprises:
receiving one or more acknowledgement messages from the network entity in response to each of the plurality of PDUs, wherein each of the one or more acknowledgement messages correspond to the successful transmission of each of the plurality of PDUs; and
determining that all of the one or more acknowledgment messages corresponding to each of the plurality of PDUs are received.

9. The method of claim 8, wherein the network configured timer is initiated in response to receiving a last acknowledgement message corresponding to the final PDU of the plurality of PDUs, and wherein the network configured timer is not initiated until the last acknowledgment message is received.

10. The method of claim 1, further comprising:
transmitting the capability message from the UE to the network entity for processing in response to adapting the use of the network configured timer; and
receiving a capability confirmation message from the network entity in response to the network entity successfully processing the capability message.

11. The method of claim 1, wherein the capability message is transmitted from the UE to the network entity on an uplink Dedicated Control Channel (DCCH).

12. The method of claim 1, wherein the capability message is transmitted on either a Signal Radio Bearer 1 (SRB1) using one or more Radio Link Control (RLC) Acknowledged Mode (AM) Protocol Data Units (PDUs) or a Signal Radio Bearer 2 (SRB2) using one or more RLC Unacknowledged Mode (UM) PDUs.

13. A non-transitory computer-readable medium storing computer executable code for adapting a network configured timer corresponding to a user equipment (UE) capability information procedure for indicating one or more UE capabilities to a network entity, comprising:

code for determining a message size of a capability message configured for transmission from the UE to the network entity during the UE capability information procedure, wherein the capability message indicates the one or more UE capabilities to the network entity; and code for performing a timer adaptation procedure, wherein the timer adaptation procedure includes adapting the use of the network configured timer based on the message size of the capability message, wherein the timer adaptation procedure further comprises:

code for calculating a total number of Protocol Data Units (PDUs) of the capability message and a total transmission time for transmission of the capability message from the UE to the network entity;

code for calculating a maximum value of a configurable timer based on the total transmission time and an additional time corresponding to a return time of a capability confirmation message from the network entity, wherein the additional time further corresponds to a processing time of the capability message at the network entity in addition to a time required for transmitting a capability message response from the network entity to the UE; and code for choosing the configurable timer for transmission of the capability message when the maximum value of the configurable timer is greater than a maximum value of the network configured timer.

14. An apparatus for adapting a network configured timer corresponding to a user equipment (UE) capability information procedure for indicating one or more UE capabilities to a network entity, comprising:

means for determining a message size of a capability message configured for transmission from the UE to the network entity during the UE capability information procedure, wherein the capability message indicates the one or more UE capabilities to the network entity; and means for performing a timer adaptation procedure, wherein the timer adaptation procedure includes adapting the use of the network configured timer based on the message size of the capability message, wherein the timer adaptation procedure further comprises:

means for calculating a total number of Protocol Data Units (PDUs) of the capability message and a total transmission time for transmission of the capability message from the UE to the network entity;

means for calculating a maximum value of a configurable timer based on the total transmission time and an additional time corresponding to a return time of a capability confirmation message from the network entity, wherein the additional time further corresponds to a processing time of the capability message at the network entity in addition to a time required for transmitting a capability message response from the network entity to the UE; and means for choosing the configurable timer for transmission of the capability message when the maximum value of the configurable timer is greater than a maximum value of the network configured timer.

15. An apparatus of adapting a network configured timer corresponding to a user equipment (UE) capability information procedure for indicating one or more UE capabilities to a network entity, comprising:

a determining component configured to determine a message size of a capability message configured for transmission from the UE to the network entity during the UE capability information procedure, wherein the capability message indicates the one or more UE capabilities to the network entity;

a processing component configured to perform a timer adaptation procedure, wherein the timer adaptation procedure includes adapting the use of the network configured timer based on the message size of the capability message; and a calculating component configured to:

calculate a total number of Protocol Data Units (PDUs) of the capability message and a total transmission time for transmission of the capability message from the UE to the network entity; and calculate a maximum value of a configurable timer based on the total transmission time and an additional time corresponding to a return time of a capability confirmation message from the network entity, wherein the additional time corresponds to a processing time of the capability message at the network entity in addition to a time required for transmitting a capability message response from the network entity to the UE; and a timer component configured to choose the configurable timer for transmission of the capability message when the maximum value of the configurable timer is greater than a maximum value of the network configured timer.

16. The apparatus of claim 15, wherein the total number of PDUs of the capability message is calculated based on the message size of the capability message and a payload size of a Radio Link Control (RLC) Acknowledged Mode (AM) PDU.

17. The apparatus of claim 15, wherein the total transmission time for transmission of the capability message from the UE to the network entity is calculated based on the total number of PDUs of the capability message and a transmission time interval (TTI) for each of the PDUs of the capability message.

18. The apparatus of claim 15, wherein the timer component is further configured to choose the network configured timer for transmission of the capability message when the maximum value of the configurable timer is less than or equal to the maximum value of the network configured timer.

19. The apparatus of claim 15, further comprising:

a transmitting component configured to transmit the capability message to the network entity for processing based on the configurable timer; and a receiving component configured to receive the capability confirmation message from the network entity in response to the network entity successfully processing the capability message.

20. The apparatus of claim 15, further comprising:

a transmitting component configured to transmit the capability message from the UE to the network entity for processing;

a receiving component configured to determine that the capability message was successfully transmitted to the network entity by the UE; and a timer component configured to initiate the network configured timer in response to the successful transmission of the capability message.

21. The apparatus of claim 20, wherein the transmitting component is further configured to:

separate the capability message in to a plurality of PDUs based on the size of the capability message; and transmit each of the plurality of PDUs to the network entity.

22. The apparatus of claim 21, wherein the receiving component is further configured to:
  receive one or more acknowledgement messages from the network entity in response to each of the plurality of PDUs, wherein each of the one or more acknowledgement messages correspond to the successful transmission of each of the plurality of PDUs; and
  determine that all of the one or more acknowledgment messages corresponding to each of the plurality of PDUs are received.

23. The apparatus of claim 22, wherein the timer component is further configured to initiate the network configured timer in response to receiving a last acknowledgement message corresponding to the final PDU of the plurality of PDUs, and wherein the network configured timer is not initiated until the last acknowledgment message is received.

24. The apparatus of claim 15, wherein the transmitting component is further configured to transmit the capability message from the UE to the network entity for processing in response to adapting the use of the network configured timer; and
  wherein the receiving component is further configured to receive a capability configuration message from the network entity in response to the network entity successfully processing the capability message.

25. The apparatus of claim 15, wherein the transmitting component is further configured to transmit the capability message from the UE to the network entity on an uplink Dedicated Control Channel (DCCH).

26. The apparatus of claim 15, wherein the transmitting component is further configured to transmit the capability message on either a Signal Radio Bearer 1 (SRB1) using one or more Radio Link Control (RLC) Acknowledged Mode (AM) Protocol Data Units (PDUs) or a Signal Radio Bearer 2 (SRB2) using one or more RLC Unacknowledged Mode (UM) PDUs.

* * * * *